United States Patent Office 3,796,807
Patented Mar. 12, 1974

3,796,807
PROCESS OF TREATING CEREAL GRAIN
John C. Whelan, Woodland, Calif., assignor to California Pellet Mill Company, San Francisco, Calif.
No Drawing. Filed Aug. 6, 1971, Ser. No. 169,816
Int. Cl. A23l 1/10; A23k 1/00
U.S. Cl. 426—468                                       3 Claims

ABSTRACT OF THE DISCLOSURE

A cereal grain at ambient pressure is mechanically deformed by being passed between mill rollers spaced apart about .002 of an inch while the grain is at its maximum plasticity at a temperature of between about 143 degrees and 160 degrees C. and preferably at 154 degrees C.

---

Cereal grains as foodstuffs have been subjected to many kinds of treatment processes in order to upgrade them so far as nutrition and digestibility is concerned. Much of the work has been accomplished in connection with the feeding of animals other than monogastric animals. These preliminary treatments have been especially designed to coact with the body chemistry of polygastric animals in order to increase the availability of the nutrients in the cereal grains for the animals. Considerable work has also been done in connection with cereal grains for consumption by humans and other monogastric animals but there still remains a good deal to be accomplished.

It is therefore a general object of this invention to provide an improved process of treatment for cereal grains to improve the adaptability of such grains for consumption by monogastric aniamls and particularly to improve the ability of such animals to utilize the starch available in the grain.

Another object of the invention is to provide a method of treating cereal grains which will present the natural starch thereof in a much better nutritional form for digestion and use by the animal.

A further object of the invention is to provide a cereal treatment process in which the conversion of the grain starch for human and other monogastric animal consumption involves little or no prolonged heating.

A further object of the invention is to provide a process for treating cereal grains to improve nutritional characteristics thereof without utilizing protracted cooking in water.

A further object of the invention is to provide a process for treating cereal grains to improve the starch digestibility thereof without involving the use of liquids.

A further object is in general to improve the nutritional and food characteristics of cereal grains.

Cereal grains as a class are generally subject to the process of the invention, although it is pointed out that some of the principal feed grains with which the process is especially useful include wheat, barley, rice, corn and sorghum vulgare-milo.

Grains ordinarily after harvest are available under ambient pressure, temperature and moisture conditions and customarily are received for treatment with a moisture content of about 9% to 11% by weight for wheat and barley and a moisture content from about 13% to 15% for milo, rice and corn.

According to the present process, grain so received and in received condition is initially maintained at substantially atmospheric or ambient pressure but is heated in dry condition fairly rapidly so that its temperature rises from ambient to a range from about 143 degrees C. to about 160 degrees C. The time required under customary conditions for such heating varies with several factors including the starting temperature and the moisture content but ranges from about one minute to not more than three minutes. During such heating the plasticity of the grains increases substantially so that instead of being brittle and shatterable they become pliable and plastic. It is found that the point of maximum or best plasticity occurs at about 154 degrees C.

When the grain has achieved maximum plasticity at a temperature of about 154 degrees C., or certainly within the range between 143 and 160 degrees C., it is without delay and as promptly as possible or suddenly (to avoid substantial change in its plasticity) forced or brought between a pair of rolling mill rolls spaced apart or set at a spacing of about .002 of an inch. The grain in passing between such rolls and because it is plastic, deforms into a new shape without any substantial splintering or shattering and so without material production of undesired fines. During the passage of the hot, plastic grain between the rolls, the structure of the starch therein is disrupted and is made mechanically more nearly suitable for consumption by humans as well as by other monogastric animals. Preferably, the rolls themselves are heated to substantially 154 degrees C. and are so maintained because it is of importance that the grain be kept at this temperature for maximum plasticity but it is also important that the duration of such elevated temperature be as short as possible.

Grain which has been treated in this fashion has been checked for its digestibility by tests with monogastric animals and also by laboratory tests, which in the past have proven reliable. For example, the principal test used is described on p. 26 of an article in the Jan. 11, 1969 issue of "Feedstuffs," vol. 41, No. 2. Such a test utilizes as a standard or control the same grain cooked in water in the usual way to provide a porridge. During that cooking the starch constituency is changed. By means of pancreatic enzymes, the digestibility of the present product has been compared with that of the indicated porridge made from the same grain. Both the present product and the same grain porridge are left with the enzyme for 30 minutes at 39 degrees C. When heated and crushed at 154 degrees C. the product is 100% as digestible as the porridge. When heated and crushed at 143 degrees C., the product is 94% as digestible as the porridge. When heated and crushed at 133 degrees C., the product is 80% as digestible as the porridge and when heated and crushed at 118 degrees C., the product is only 63% as digestible as the porridge.

In addition to the reduction in digestibility, as measured by the standard test, with reduction in initial heating temperature, it is also found that the plasticity is markedly lowered when the treatment temperature is below the indicated range. If the plasticity is sufficiently low the grain shatters when it is rolled. This is undesirable because it results in a large proportion of unwanted, fine, sharp particles rather than in relatively large, discrete, rounded or smooth shapes of the grain.

It is also found that if the initial heating temperature is raised a little above 154 degrees C., there is no particular benefit so far as digestibility is concerned, although shattering is somewhat lessened. On the other hand, if the heating is only to a temperature substantially below 154 degrees C. then there is materially less digestibility, as indicated above, and the shattering is likewise increased.

At a large increase in temperautre above about 154 degrees C., the plasticity is again reduced and shattering may actually be increased, this time probably because there is a substantial expulsion of moisture. Furthermore, treatment well above the indicated temperature range tends to cause an undesirable roasting or caramelization of the grain which, to most tastes, effects an adverse palatability. In addition, at substantially higher temperatures there is a slight tendency for lowered digestibility, probably through the formation of pyrodextrins.

In some grains, particularly sorghum vulgare-milo, treatment within the indicated temperature range is satisfactory but if the temperature range substantially exceeds the indicated range, then the waxy coat of the milo melts and causes an agglomeration which interferes with processing.

As a result of the indicated process, it is possible to afford a dry cereal grain product for monogastric animal consumption without wetting the grain or subjecting it to a long boiling or porridge operation and with a very short heating and roller treatment time at a moderate temperature, the results being to produce a dry product which is, as indicated, of a digestibility comparable to that of the customary porridge.

What is claimed is:

1. A process for treating cereal grain which consists essentially of the steps of:
    (a) taking cereal grain received after harvest which is at ambient pressure, temperature, and moisture conditions and heating it in dry condition at ambient pressure for 1 to 3 minutes to a product temperature from about 143° C. to 160° C.;
    (b) promptly subjecting said grain heated to said temperature to passage between rotating rolls of a rolling mill set at a distance apart of about 0.002 of an inch; and
    (c) permitting the product discharged from the rolls to resume ambient pressure and temperature.

2. A process as in claim 1 in which said elevated temperature is 154 degrees C.

3. A process as in claim 1 in which said rolls are also at a temperature of from about 143 degrees C. to 160 degrees C.

References Cited

UNITED STATES PATENTS 3,336,137   8/1967   Hickey _____ 99—80 R

FOREIGN PATENTS 500,706   3/1954   Canada.

RAYMOND N. JONES, Primary Examiner

U.S. Cl. X.R.

426—145, 208, 210